March 27, 1934.  W. J. HOGG  1,952,316
HOLDING DEVICE FOR CHASER BLOCKS
Filed Aug. 15, 1931
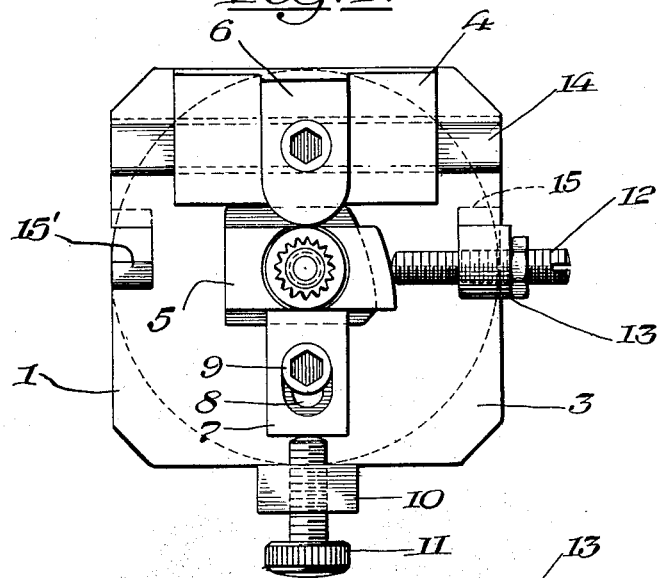
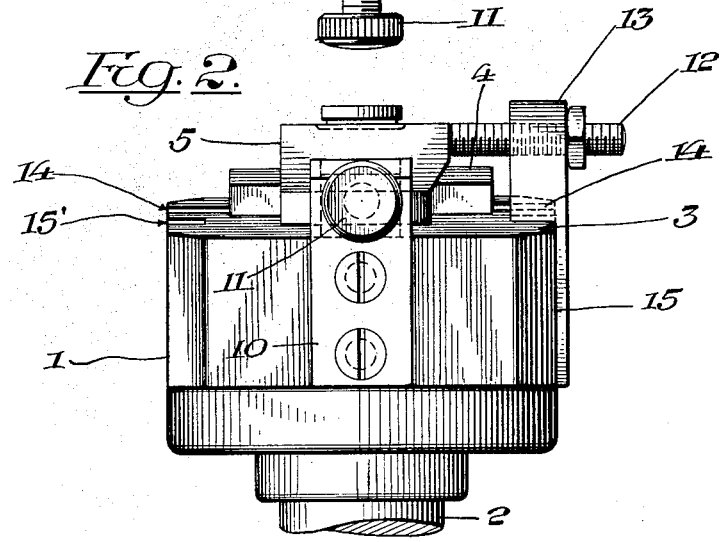
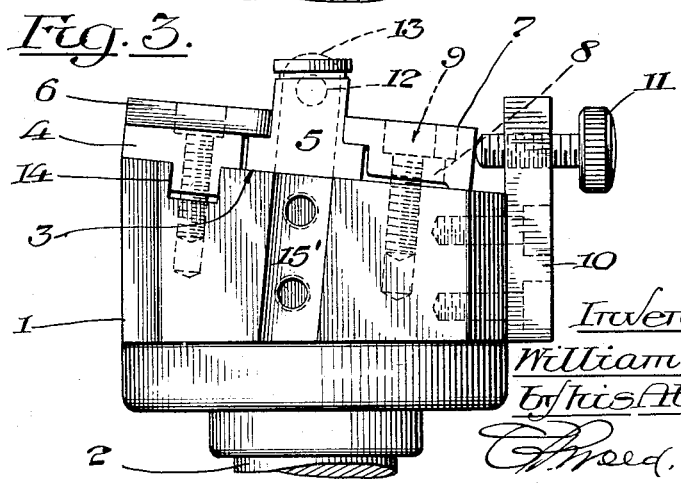

Patented Mar. 27, 1934

1,952,316

UNITED STATES PATENT OFFICE 1,952,316

HOLDING DEVICE FOR CHASER BLOCKS

William J. Hogg, Cleveland, Ohio, assignor to The National Acme Company, Cleveland, Ohio, a corporation of Ohio Application August 15, 1931, Serial No. 557,215

10 Claims. (Cl. 51—217)

This invention relates to grinding fixtures particularly adapted for use in the grinding of chaser blocks for circular chasers or cutters of threading dies such as shown and described in my contemporaneously pending application, Serial No. 459,700, filed June 7th, 1930.

As pointed out in said application, the front face of each supporting block is inclined transversely thereof, whereby the chasers will be angularly set or inclined to the front face of the die body so that the grooves of the chasers may be cut circularly straight and not spirally, and yet have the effect of spirally cut grooves since the front faces of the die blocks are formed on an angle in relation to the front face of the die body, thus giving the proper angular setting to the chasers and controlling the proper cutting edge and clearance thereof.

As it is essential that all of the blocks of the die have the same angle of inclination on the front faces thereof, it is necessary that means be provided to insure this result so that they can all be ground precisely alike.

Therefore, the object of the present invention is the provision of a grinding fixture that will insure the proper helix angle of the face of the chaser block and thus enable the chaser block to be properly drilled and counterbored for the serrations formed in that counterbored hole, and which grinding fixture will be simple in construction, efficient in use, inexpensive to manufacture and also durable and easily manipulated to insure the desired results.

In the drawing accompanying and forming a part of this specification, Fig. 1 is a top view of this improved grinding fixture.

Fig. 2 is a side view thereof, and

Fig. 3 is a side view at right angles to that shown in Fig. 2.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing since the invention is capable of other embodiments, and that the phraseology which I employ is for the purpose of description and not of limitation.

In the preferred form thereof, a suitable block or holder 1 having a shank 2 is provided, the shank being adapted to fit the machine with which the fixture is to be used.

The body of this holder 1 has its upper face machined at the proper angle as at 3. On the face at one side of the holder is located a T-shaped strip or member 4 for positioning the chaser block shown at 5 in proper position to be ground.

Carried in a milled opening of this strip or member is a clamp 6 adapted to overlap the projecting base of the chaser block and clamp it in position on the face of the holder.

At the opposite side of the holder is another clamp 7 in position to engage the opposite side of the chaser block, this last clamping member having an elongated slot 8 whereby it may be adjusted toward and from the chaser block, it being held in position by a suitable clamping bolt 9. Both of these clamps 6 and 7 overlap a part of the chaser block.

Carried at the side of the block is a bracket 10 having an adjustable micrometer screw 11 for adjusting the clamping member 7 into position to accommodate various sizes of chaser blocks.

The holder is also provided with an adjusting micrometer screw 12 carried by a suitable detachable bracket 13 secured to the holder for adjusting the chaser block at right angles to the adjusting screw 11.

In practice, the locating member or strip 4 is shown carried by a slot 14 in the holder and this member 4 and the slot 14 are both accurately milled. This locating member 4 may be readily changed and another substituted to accommodate different sizes of blocks. This member 4 engaging the side of the block locates the same in position and supports the clamping member 6 which is located in a transverse recess thereof. The holder is also provided with a recess 15 and 15' for the reception of the bracket 13 carrying the adjusting screw 12 whereby this may be located at either side of the holder.

It will be observed that the inclined face of the holder extends in a direction transverse to the length of the chaser block so that the top of the chaser block may be ground cross-wise thereof, that is, cross-wise of its normal position in the die in which the chaser blocks are set to shift radially of the die so that the chasers or cutters may be opened or closed relative to the work and, consequently, the length of the chaser block extends radially to the die axis.

From the foregoing, it will be observed that when the chaser is mounted on the inclined face 3 of the holder and properly positioned and clamped, the front face thereof can be ground to correspond with the inclination of the holder in an expeditious manner so that all of the chaser blocks can be uniformly ground while, at the same time the serrated opening in the chaser block is properly positioned for boring. Consequently, the holes in all of the chaser blocks will be located uniformly while the faces of the block can be ground at the proper angle.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A grinding fixture for chaser blocks comprising a holder having a permanently fixed inclined face with an angle of inclination corresponding to the helix angle of the chaser block, an interchangeable locating member secured on the face of said holder, a clamping member carried thereby, a clamping member located at the opposite side of said holder and having an elongated slot to permit the adjustment thereof, an adjusting screw for regulating the position of said last clamping member, and an adjusting screw for regulating the position of the block.

2. A grinding fixture for chaser blocks comprising a holder having an inclined face and located transversely to the direction of the length of the chaser block, said holder having a pair of oppositely located recesses and also a crosswise extending recess, a T-shaped locating member secured in the cross-wise recess of the holder, a clamping member, an oppositely located clamping member adjustably secured to the face of the holder, means for adjusting said last clamping member, a detachable bracket secured in one of the recesses of the holder, and means carried thereby for adjusting the position of the chaser block relative to the clamping means.

3. A grinding fixture for chaser blocks of circular threading dies comprising a holder having a permanently fixed inclined face with an angle corresponding with the helix angle of the chaser block, the inclination of said face being transverse to the direction of the length of the chaser block, relatively adjustable means carried by the holder and overlapping opposite sides of the block for clamping said block in position on said face thereby to locate the block, and a fixed locating means for engaging one side of the block, said locating means supporting one of said clamping means.

4. A grinding fixture for chaser blocks of circular threading dies comprising a holder having a permanently fixed inclined face with an angle corresponding with the helix angle of the chaser block, a pair of clamping means overlapping the opposite sides of the chaser block, a fixed locating means engaging one side of the block and supporting one of said clamping means, and means for laterally adjusting one of said clamping means relative to the other clamping means thereby to locate the chaser block.

5. A grinding fixture for chaser blocks of circular threading dies comprising a holder having a permanently fixed inclined face with an angle corresponding with the helix angle of the chaser block, a pair of clamping means overlapping the opposite sides of the chaser block, a fixed locating means engaging one side of the block and supporting one of said clamping means, means for laterally adjusting one of said clamping means relative to the other clamping means thereby to locate the chaser, and means for adjusting the block at an angle to its adjustment by said clamping means.

6. A grinding fixture for chaser blocks of circular threading dies comprising a holder having a permanently fixed inclined face with an angle corresponding with the helix angle of the chaser block, a pair of oppositely located clamping means carried by said face and relatively adjustable toward and from each other and overlapping the opposite sides of the block, one of said clamping means comprising a pair of members, one forming a locating means for one side of the block and the other member supported thereby, and means for adjusting the chaser block relative to the clamping means.

7. A grinding fixture for chaser blocks of circular threading dies comprising a holder having a permanently fixed inclined face with an angle corresponding with the helix angle of the chaser block, a pair of oppositely located clamping means for securing the chaser block on the face of the holder and overlapping the opposite sides of the chaser block, a fixed locating means for engaging one side of the block and supporting one of said clamping means, means for laterally adjusting the other of said clamping means relative to its companion clamping means thereby to locate the chaser block, and detachable means for adjusting the chaser block relative to the clamping means and attachable to either side of the holder.

8. A grinding fixture for chaser blocks of circular threading dies comprising a holder having a permanently fixed inclined face with an angle corresponding with the helix angle of the chaser block, a pair of oppositely located clamping members carried by said holder and overlapping the opposite sides of the chaser block, an interchangeable locating means supported adjacent to one of said clamping means for engaging one side of the block, means for laterally adjusting said clamping means relative to each other thereby to locate the chaser block, and means for adjusting the chaser block relative to the clamping means.

9. A grinding fixture for chaser blocks of circular threading dies comprising a holder having a permanently fixed inclined face with an angle corresponding with the helix angle of the chaser block, a locating member on the face thereof for engaging one side of the block, a clamping member secured to said locating member, an adjustable clamping member at the opposite side of said holder, said clamping means overlapping the opposite sides of the chaser block, means for laterally adjusting one of said clamping means and thereby the chaser block, and means for adjusting the chaser block relative to the clamping means.

10. A grinding fixture for chaser blocks of circular threading dies comprising a holder having a permanently fixed inclined face with an angle corresponding with the helix angle of the chaser block, a pair of oppositely located clamping means carried by said holder and relatively adjustable toward and from each other, a locating member carried by said holder for engaging one side of the block and having a transverse slot for the reception of one of said clamping means, and detachable means for adjusting the chaser block relative to the clamping means whereby it may be positioned at either side of the holder.

WILLIAM J. HOGG.